Oct. 28, 1969    G. M. WILMSEN ET AL    3,474,662
NONDESTRUCTIVE TESTING OF SHIRRED CASING

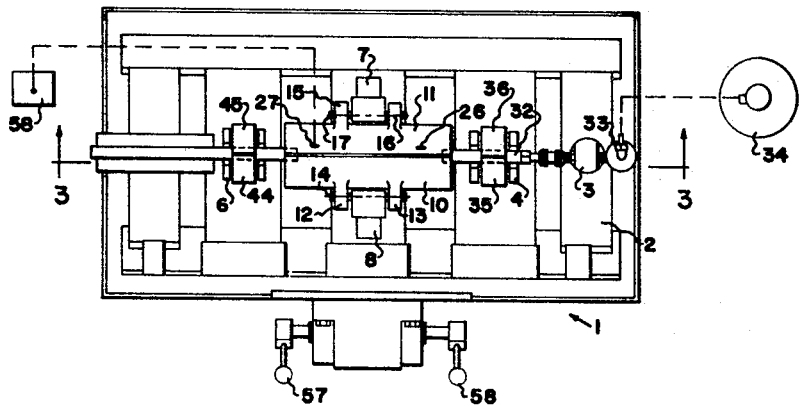

Filed May 2, 1967    3 Sheets-Sheet 3

GEORGE M WILMSEN
CLARENCE M ALSYS
*INVENTOR.*

BY *Neal J Mosely* their attorney

Oct. 28, 1969         G. M. WILMSEN ET AL         3,474,662
           NONDESTRUCTIVE TESTING OF SHIRRED CASING
Filed May 2, 1967                                 3 Sheets-Sheet 2

GEORGE M WILMSEN
CLARENCE M ALSYS
    *INVENTOR.*

BY *Neal J Mosely* their attorney

United States Patent Office 3,474,662
Patented Oct. 28, 1969

3,474,662
NONDESTRUCTIVE TESTING OF
SHIRRED CASING
George M. Wilmsen, Danville, Ill., and Clarence M. Alsys, Ann Arbor, Mich., assignors to Tee-Pak, Inc., a corporation of Illinois
Filed May 2, 1967, Ser. No. 635,488
Int. Cl. G01m 3/04
U.S. Cl. 73—40.7
9 Claims

ABSTRACT OF THE DISCLOSURE

Artificial sausage casings, especially casings of regenerated cellulose, paper-reinforced regenerated cellulose, collagen, etc., in a shirred form are tested for the presence of minute holes which may enlarge and tear during stuffing by impressing a tracer gas under pressure into the interior of the shirred casing and measuring for leakage of the tracer gas along the exterior surface of the shirred casing. Any suitable tracer gas may be used although easily detected gases such as helium or low molecular weight chlorinated hydrocarbons are preferred. It is also preferred to enclose the shirred strand within a tight enclosure and circulate an inert sweep gas over the external surface of the shirred strand while maintaining the tracer gas under pressure within the strand. The sweep gas is then tested using a conventional gas detector to determine the presence of the tracer gas. Extensive tests with the apparatus have shown a very accurate correlation with the actual breakage of casings in destructive tests, such as water burst or air burst tests, and also with the breakage encountered in actual stuffing of the casings.

Background of the invention

Artificial sausage casings have been made commercially for about forty years. Most of the artificial sausage casings are made of clear regenerated cellulose or regenerated cellulose reinforced with a fibrous paper. Thin light weight regenerated cellulose casings are used primarily in the preparation of weiners or frankfurters and are removed from the meat after smoking or cooking so that the meat reaches the consumer in a skinless condition. The heavier weight regenerated cellulose casings and the fibrous paper-reinforced casings are used primarily in the production of larger diameter sausages, such as bolognas, salamias, etc., and are generally removed by the consumer at the time of eating or further cooking or processing. Artificial casings have also been made from collagen fibers or fibrils derived from hide or tendon. Collagen casings have been made for many years in a heavy weight and used for large diameter sausages where the casing must be removed from the meat prior to cooking and eating. Recently, thin, light weight collagen casings have been prepared which are completely edible and are used in the preparation of pork sausages and some weiner or frankfurter sausages. These casings are eaten with the meat and are easily masticated and digested.

Artificial sausage casings, particularly small diameter clear regenerated cellulose sausage casings and small diameter thin, light weight collagen casings are normally prepared in a shirred form for delivery to the meat packer. In the preparation of shirred casings, casings are normally supplied as large reels of flat tubes to a machine which unwinds and inflates the tubular casing and mechanically shirrs it into a smooth pattern of helical or circumferential pleats. In the most advanced shirring machines it is possible to shirr as much as 160–200 feet of casing into shirred lengths of about 20–25 inches. Casings are commercially provided in shirred strands containing from 32 feet up to 200 feet of casing, as measured in the unshirred or deshirred condition.

In the handling of shirred casing by the meat packer, the casing is placed on a stuffing horn, sometimes by an automatic machine, and stuffed from a shirred length of 4–20 inches out to a fully stuffed length of 40–200 feet in a period of about 3–15 seconds. The casing is formed into links after it is stuffed, or in some cases as it is stuffed, and the links smoked and cooked prior to removal of the casing (edible collagen casing may be left on the sausages). In view of the very severe mechanical stresses imposed upon the casing during stuffing and linking it is essential that the casing be almost 100% free of breakage. In fact, one casing break per mile of casing can barely be tolerated by the packer. It is therefore essential that the casing manufacturer have suitable means for testing representative samples of the casing at the time of manufacture to determine the quality of the casing and the likelihood of breakage.

In the past, three major types of tests have been used to determine the quality of the casing or its tendency toward breakage. Casing has been subjected to air tests in which air pressure is applied to a shirred strand, having its end tied closed, and the casing blown out rapidly from a shirred condition to a fully extended condition under pre-determined pressure. The test of quality would be the number of breaks under a predetermined pressure applied to the test strands. Casing has also been tested by applying water pressure internally to a de-shirred strand which is tied off after being filled with water. In such a test, the number of breaks at a given hydraulic pressure would determine the quality of the casing. The compressed air and water breakage tests only approximate the conditions encountered in actual stuffing. As a result, most casing manufacturers test a certain number of casings under stuffing conditions using a synthetic stuffing emulsion having a consistency approximately that of a sausage emulsion. In this type of test the quality of the casing is measured in terms of the number of breaks in the casing per selected number of test samples. Of course, the ultimate test of casing is how well it performs under actual stuffing conditions in a meat packing house. The correlation of water breakage and compressed air tests and of the synthetic meat emulsion stuffing test is very good. These tests give a fairly accurate measurement of the probable performance of the casing under actual stuffing conditions. These tests however consume the casing which is being tested. Once the casing has been expanded and broken by the test medium, viz. water, air, or synthetic sausage emulsion, the casing can no longer be used and must be scrapped. In order to obtain an accurate correlation of the test casings with actual stuffing conditions, it is necessary to test up to 5% of the casing being manufactured. In a large casing manufacturing plant the loss of production resulting from destructive testing of casing may range from a few thousand dollars up to as much as one million dollars annually. There has therefore been considerable need for the development of a suitable test for quality of casing which does not require the destruction of the casing.

Summary of the invention

This invention comprises a new and improved process and apparatus for the nondestructive testing of shirred sausage casings. The shirred sausage casing is partially deshirred at each end and one deshirred portion clamped to a suitable gas pressure inlet and the other deshirred portion sealed off. A gas is applied under sufficient pressure to the interior of the shirred casing to pass through any small holes, cuts or tears in the casing. The gas may be a trace gas in itself or may be an inert diluent gas carrying a suitable trace gas. Preferred gases which may be used for this purpose are helium or low molecular weight chlorinated hydrocarbons, both of which are easily detected by commercially available gas detectors. While the shirred casing has the gas pressure, with trace gas component, applied internally, the exterior of the shirred casing is enclosed tightly and a sweep gas passed over the surface of the casing to pick up minute qualities of the trace gas which may escape from the interior of the strand through any holes, cuts, tears, or breaks in the casing.

The process is preferably carried out in an automatic or semi-automatic apparatus having an enclosure which is opened to permit insertion of the shirred casing strand. The shirred strand of casing has a small portion deshirred from each end and one portion placed over a tubular inlet member. The enclosure is then clamped together around the tubular inlet member to clamp the deshirred casing portion in place and seal the other end of the casing. The tracer gas is then applied through the tubular inlet member to the interior of the casing. The enclosure around the casing has a pair of openings to the atmosphere. A gas detector device connected to vacuum or other suitable suction means is applied at one of the holes so that air is drawn into the enclosure through the other hole to pick up any trace gas passing out from the shirred casing strand. The air which is drawn through the enclosure is drawn into the gas detector device which indicates the presence or absence of the trace gas. By selection of suitable internal pressures for the trace gas and suitable sensitivity for the gas detector instrument it is possible to establish a correlation in this test which is as accurate or more accurate than that observed for the destructive type test. That is, this test evaluates casing, without destruction of the casing, in terms of its actual performance in sausage stuffing, as well as any of the destructive tests, including air burst, water burst and synthetic stuffing tests.

Brief description of the drawings

In the accompanying drawings, to be taken as a part of this specification, there is clearly and fully illustrated, a preferred embodiment of this invention, in which drawings:

FIG. 1 is a plan view of the nondestructive test apparatus comprising this invention or used in carrying out the process of this invention, FIG. 2 is a view in front elevation of the apparatus shown in FIG. 1.

Description of the preferred embodiment

Figure 4:
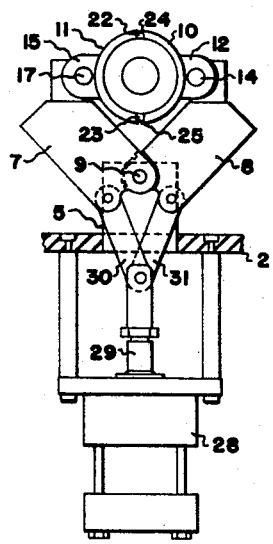
FIG. 4 is a view partially in section taken on the line 4—4 of FIG. 2 and showing the chamber or enclosure for the casing being tested in a closed position.

Referring to the drawings by numerals of reference and more particularly to FIGS. 1 and 2 there is shown a nondestructive test apparatus generally designated 1. Test apparatus 1 includes supporting frame-work or mounting 2 having fixed support 3 and pivotal supports 4, 5 and 6 respectively. Pivotal support 5 supports pivot arms 7 and 8 which are pivotally connected on pivot pin 9. There are provided a pair of members 10 and 11 which are of half cylindrical form and when closed in the position shown in FIGS. 1, 2 and 4 form a closed cylindrical chamber enclosing the casing to be tested. Chamber member 10 is provided with a pair of ears 12 and 13 which are pivotally connected by pivot pin 14 to supporting pivot arm 8. Chamber member 11 is similarly provided with a pair of ears 15 and 16 which are connected by pivot pin 17 to pivot arm 7.

Figure 3:
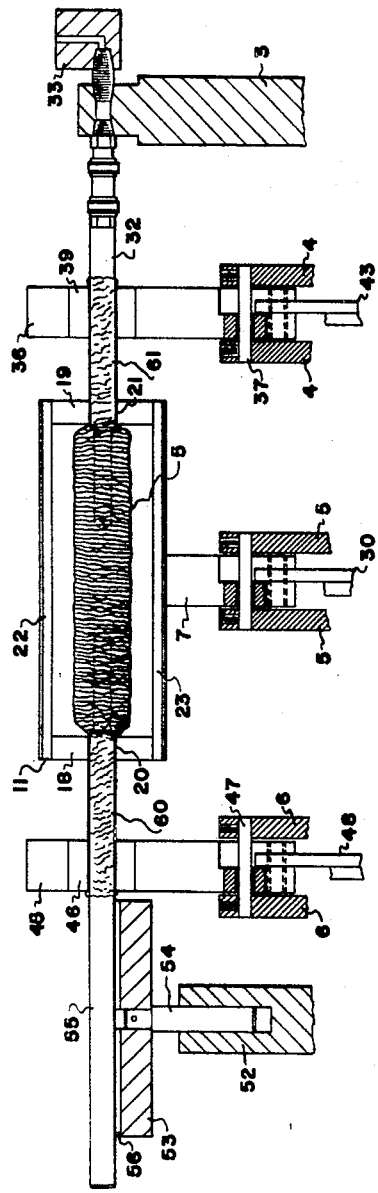
FIG. 3 is a sectional view taken on the line 3—3 of FIG. 1, and slightly enlarged in relation to FIG. 1.

In FIG. 3, the hollow cylindrical structure of chamber members 10 and 11 is shown in more detail. FIG. 3 is a sectional view, taken on the line 3—3 of FIG. 1, and shows the relationship of chamber members 10 and 11 to the casing being tested. Chamber member 11 is a hollow half cylinder provided with end walls 18 and 19 having apertures 20 and 21 centrally located. The structure of member 10 is essentially the mirror image of member 11 and is provided with end walls and aperture portions aligning with end walls 18 and 19 and aperture portions 20 and 21. The end walls of the chamber members are of a soft rubber or other elastomeric material to provide a hermetic seal around the ends of the casing, as will be hereinafter described. Chamber member 11 is provided with rubber gaskets 22 and 23 extending longitudinally thereof and positioned to meet with similar gaskets 24 and 25 on chamber member 10. Chamber member 11 is provided with apertures 26 and 27 for application of a gas detector and for circulation of air through the enclosed chamber as a sweep gas.

The apparatus is provided with pneumatic (or hydraulic) actuator 40 positioned beneath supporting frame mounting 2 and provided with movable pistons 29 connected by linkages 30 and 31 to pivotal supporting arms 7 and 8. Movement of piston 29 upward causes pivotal arms 7 and 8 to hold chamber members 10 and 11 in a closed position as shown in FIG. 4. Movement of piston 29 downward causes pivotal arms 7 and 8 to pivot outward and open the chamber enclosing the casing being tested.

At the right end of the apparatus, as viewed in FIGS. 1 to 3, supporting member 3 supports hollow tubular conduit member 32 and is also connected to an elbow or connector 33 for connecting cylinder 34 containing a tracer gas such as helium or a low molecular weight chlorinated and/or fluorinated hydrocarbon. Tubular conduit member 32 extends through a pair of clamps 35 and 36 which are mounted on pivotal support members 4, and into the cylindrical space enclosed by members 10 and 12 when in closed position as seen in FIGS. 1, 2 and 3. Clamp members 35 and 36 are pivotally mounted on support member 4 by pivot pin 37 and are provided with rubber or other elastomeric gasket members 38 and 39.

Figure 5:
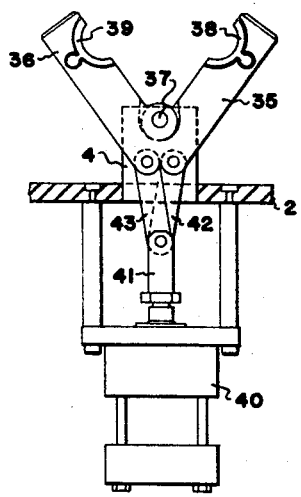
FIG. 5 is a view, partially in section, taken on the line 5—5 of FIG. 2 showing one of the casing end clamps in an opened position.

The apparatus is provided with a pneumatic (or hydraulic) actuator 40 positioned beneath supporting frame work or mounting 2 and having movable piston 41 connected by linkages 42 and 43 to clamp members 35 and 36 respectively. When piston 41 is in a lowered position, as seen in FIG. 5, clamp members 35 and 36 are opened. When piston 41 is moved upward, clamp members 35 and 36 are moved to a closed position with gaskets 38 and 39 clamping the end portion of the casing being tested around tubular conduit member 32, as seen in FIG. 3.

At the left end of the apparatus, as seen in FIGS. 1 to 3, there is provided a pair of clamp members 44 and 45 which are of essentially identical construction to the clamp members 35 and 36. Clamp members 44 and 45 are provided with rubber gasket members 46 which correspond to gasket members 38 and 39 as seen in FIG. 5. Clamp members 44 and 45 are pivotally supported on supporting member 6 by pivot pin 47. Clamp members 44 and 45 are connected by linkages 48, corresponding to linkages 42 and 43 in FIG. 5, to piston 49 arranged for actuation by pneumatic (or hydraulic) actuator 50. Actuation of piston 49 to an upward position closes clamp members 44 and 45, while movement to a downward position opens said clamp members.

At the left end of the apparatus, there is provided a support member 51 extending vertically from supporting base 2 and provided with a vertically extending cylindrical passage 52. A movable supporting member 53 having a supporting rod 54 positioned in passage 52 is arranged to support a solid rod 55 extending through clamps 44 and 45 into the interior of the hollow chamber defined by members 10 and 11. Rod member 55 is supported movably in a V-shaped notch 56 extending longitudinally of supporting member 53. Supporting rod 54 may be adjusted vertically and fixed in position by a set screw having a handle 57, as seen in FIG. 2.

The pneumatic (or hydraulic) actuators for clamps 35 and 36, 44, and 45, and cylindrical chamber members 10 and 11 are supplied with compressed air (or hydraulic fluid pressure) from an external support and are controlled by valves (the details of which are not shown) having actuator handles 57 and 58 for causing the clamps and chamber members to be moved to open and closed positions, respectively.

The apparatus is provided with gas cylinder 34 which is connected, as shown by the dotted line in FIGS. 1 and 2, to elbow 33 for supplying a tracer gas to the interior of the casing being tested. The apparatus is provided with a gas leak detector 58 which is connected to a source of vacuum 59 and has a tubular probe or conduit which is connected as shown in dotted line to opening 27 in the enclosure formed by members 10 and 11. The leak detector mechanism 58 which may be used in connection with this apparatus is selected according to the type of tracer gas supplied from cylinder 34. If the gas supplied from cylinder 34 is a chlorinated and/or fluorinated hydrocarbon, a conventional leak detector of the type used for detecting leakage from refrigeration systems would be used. If the gas supplied from cylinder 34 is a low molecular weight tracer, such as helium, a thermal conductivity leak detector, such as the model 500 series leak detector, manfactured by the Upson Corporation, or the Thermal Conductivity Leak Detector manufactured by Consolidated Electrodynamics Corporation, may be used. Each of these instruments works on the principle of comparing the thermal conductivity of a gas sample with the thermal conductivity of the surrounding, uncontaminated atmosphere and indicating the presence of a contaminating or tracer gas by a detected variance in thermal conductivity.

Operation

The apparatus described above is operated to carrry out the novel process of this invention substantially as described in connection with the function of the various parts of the apparatus. Handles 57 or 58 are operated to cause the pneumatic (or hydraulic) actuators to open clamps 35 and 36 and 44 and 45 and chamber members 10 and 11. A strand of shirred sausage casing S has a small portion of casing 60 or 61 deshirred at each end. The deshirred portion 61 is placed over conduit member 32, as seen in FIG. 3, so that conduit member 32 is positioned to supply the tracer gas to the interior of the shirred strand. Deshirred portion 60 of casing is placed over rod member 55 which is adjusted longitudinally according to the length of the shirred strand of the casing being tested.

Actuator handle 57 or 58 is then actuated to cause the pneumatic (or hydraulic) actuators to close clamps 35 and 36 and 44 and 45 to clamp the deshirred portions of casing 61 and 60 tightly arond conduit 32 and rod 55, respectively. Simultaneously, members 10 and 11 are closed with gaskets 22 and 24 and 23 and 25 engaging to form a hermetic seal longitudinally of the enclosure. At the same time, the rubber (or other elastomeric) end wall members 18 and 19 clamp the portion of deshirred casing adjacent to the end of the shirred strand S tightly around conduit member 32 and rod member 55, respectively.

Gas cylinder 34 is then opened to supply a tracer gas, preferably helium, to the interior of shirred strand S through conduit member 32. The helium is supplied under a relatively low pressure, viz. 1–10 p.s.i.g., and preferably at a pressure of about 3–5 p.s.i.g. Higher pressures may be used if desired, up to the pressure which would burst the casing, but are generally unnecessary. Likewise, lower pressures can be used but a more sensitive gas detector is required or a greater period of time is required to sense the possible leakage of gas. The helium which is supplied to the interior of the shirred strand will not leak through the casing to an appreciable amount if there are no pin holes, cracks, etc. in the casing. The gas detector 58 has its detection tube applied to aperture 27 in the enclosure formed by members 10 and 11 and is connected to a source of vacuum 59. Any helium which escapes from the interior of shirred strand S through any holes or breaks therein will be held within the enclosure formed by members 10 and 11. The vacuum which is applied through aperture 27 causes air to be drawn in through aperture 26 and sweep through the enclosure. The air which sweeps through the enclosure is drawn out through aperture 27 into leak detector apparatus 58. If the sensitivity of the instrument is adjusted properly the detection of a pre-determined amount of helium escaping from the interior of shirred strand S has been found to correlate exactly with the discovery of leaks in similar samples as measured by air burst or water burst or synthetic stuffing tests.

The apparatus, as described above, was tested over a period of several weeks on commercial grades of shirred sausage casings of clear regenerated cellulose. The individual shirred strands were tested for leakage using helium as the test gas supplied to the interior of the strand at a pressure of 4–5 p.s.i.g. The gas leak detector was applied to the apparatus, as described above, for a period of 5–15 seconds (periods of 1–2 seconds may be used provided that gas detectors of suitable sensitivity are used) to determine the amount of leakage, if any, from the interior of the strand. It was found that the amount of leakage of helium from within the individual strands could be correlated with the water burst and air burst and synthetic stuffing tests with a reliability such that it has been possible to eliminate those procedures as test procedures for most shirred casings. This test procedure does not destroy the casing being tested and the casing may be packaged and sold whenever it passes the test. The casings which do not pass the test are, of coure, considered unsatisfactory and are scrapped.

While we have described our invention fully and completely with emphasis upon the preferred embodiment thereof we wish it to be understood that the invention may be practiced otherwise than as specifically described herein.

We claim:

1. A nondestructive test method for determining defects in shirred strands of sausage casings which comprises:
   (a) deshirring opposite end portions of a shirred strand of casing for a short distance,
   (b) hermetically sealing one deshirred end portion to a closure,
   (c) hermetically sealing the other deshirred end portion to means for supplying a tracer gas,
   (d) supplying a tracer gas under a small pressure to one surface of the hermetically sealed strand,
   (e) passing a sweep gas over the opposite surface of the shirred strand for a period of 1–15 seconds, and
   (f) measuring the sweep gas for presence of a pre-determined amount of said tracer gas.

2. A method as defined in claim 1 in which the tracer gas is helium or a low molecular weight halogenated hydrocarbon.

3. A method as defined in claim 1 in which the shirred strand of casing is enclosed, the tracer gas is supplied to the interior of the strand, and the sweep gas passed along the outer surface of the strand.

4. A method as defined in claim 1 in which the tracer gas is supplied under a pressure of about 1–10 p.s.i.g.

5. A method as defined in claim 1 in which the sweep gas is passed through a thermal conductivity type gas detector.

6. An apparatus for non-destructive testing of shirred strands of sausage casings which comprises:
   (a) clamp means to form a hermetic seal with and close a deshirred portion of casing at one end of a strand of casing to be tested,
(b) sealing means including an insert member adapted to extend into a deshirred portion of casing at the other end of the casing to be tested and clamp means for clamping the casing thereagainst,
(c) means for supplying a tracer gas under a small pressure to one surface of the hermetically sealed strand,
(d) means to pass a sweep gas over the opposite surface of the shirred strand, and
(e) including means to confine said sweep gas and any escaped tracer gas adjacent to the surface of the shirred strand and adapted to be connected to gas detection means to measure the presence of escape tracer gas in said sweep gas.

7. An apparatus as defined in claim 6 in which said confining means comprises:
(a) a pair of members defining a hollow chamber when in engagement,
(b) means to move said chamber forming members into and out of engagement surrounding a shirred strand of casing to be tested.

8. An apparatus as defined in claim 7 in which said insert member is a hollow conduit which also functions as said gas supply means.

9. An apparatus as defined in claim 8 in which said chamber forming members have deformable end walls surrounding said conduit means and said rod member and adapted to secure said deshirred casing portions thereagainst when in chamber-forming engagement.

References Cited

UNITED STATES PATENTS

| | | | |
|---|---|---|---|
| 2,336,524 | 12/1943 | Bannister | 73—49.5 XR |
| 2,703,978 | 3/1955 | Baxter | 73—40.7 |
| 3,029,628 | 4/1962 | Minter | 73—40.7 XR |
| 3,036,457 | 5/1962 | Wood et al. | 73—40.7 XR |
| 3,112,517 | 12/1963 | Ives | 17—42 |
| 3,186,214 | 6/1965 | Roberts | 73—40.7 |
| 3,339,402 | 9/1967 | Rudszinat | 73—49.8 XR |

OTHER REFERENCES

Article: "Helium Leak Testing Fuel Rods for the PWR Blanket"; by A. E. Oakes; appearing in Nondestructive Testing; September-October 1960; in class 73, subclass 40.7.

LOUIS R. PRINCE, Primary Examiner

J. NOLTON, Assistant Examiner

U.S. Cl. X.R.

17—42; 73—49.8